UNITED STATES PATENT OFFICE.

WILHELM KÖNIG, OF OHRDRUF, GERMANY.

RED AZO DYE FOR LAKES AND PROCESS OF MAKING SAME.

942,916. Specification of Letters Patent. Patented Dec. 14, 1909.

No Drawing. Application filed September 12, 1907. Serial No. 392,466.

*To all whom it may concern:*

Be it known that I, WILHELM KÖNIG, doctor of philosophy, chemist, a subject of the Emperor of Germany, residing at Ohrdruf, in the Duchy of Saxe-Coburg-Gotha, Germany, have invented new and useful Improvements in Red Monoazo Dyestuffs Specially Valuable for the Preparation of Pigment Colors Entirely Insoluble in Oil, of which the following is a specification.

So far as I am aware, all the pigment colors insoluble in oil prepared hitherto from coal-tar colors contain one or more sulfo groups in the molecule. Colors which contain a carboxylic group obtained by combining anilin carboxylic acids, diazotized with beta-naphthol, are very readily soluble in oil, and compounds of anilin and its indifferent derivatives, diazotized with naphthol carboxylic acids, especially 2.3-oxynaphthoic acid, are also soluble in oil. I have discovered that, contrary to expectation, dye stuffs produced by combining anilin carboxylic acids diazotized with 2.3-oxynaphthoic acid (having a melting point of 216 degrees centigrade) will yield pigment colors which are in the form of metallic salts and which are completely insoluble in oil.

The new dyestuffs are of the general formula:

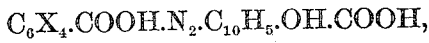

wherein X means hydrogen atoms or Cl, Br, I, alkyl groups, alkyloxy groups, $NO_2$ and other indifferent substitutes in any number and structural arrangement within the molecule.

The following shows how these new coloring matters may be produced. The parts are by weight.

Example: 17.15 parts of chloranilin carboxylic acid ($NH_2$:Cl:COOH 1:2:5) are dissolved in 17 parts of hydrochloric acid 20° Baumé diluted before with 500 parts of water. This solution is cooled down to 5° centigrade by addition of ice and thereupon diazotized by adding slowly 6.9° parts of sodium nitrate. The diazo solution thus obtained is then poured into a cold solution of 19 parts of 2.3-oxynapthoic acid (having a melting point of 216° C.) in 33.5 parts of caustic soda lye 36° Baumé previously diluted with 200 parts of water and mixed with a solution of 5.5 parts of calcined soda. After the combination is completed the dyestuff is precipitated by addition of common salt and then filtered in the usual manner.

For preparing pigment colors the dyestuff may be employed in the form of a paste or in the form of a powder. The solution or the paste of the sodium salts first formed is mixed in the usual manner with solutions of metal salts, for instance of barium chlorid, calcium chlorid, nitrate of lead and others and then stirred at a lower or higher temperature for the purpose of mutual decomposition. The nature of the substratum or body may be accommodated to the intended application of the pigment color, so for instance highly ground native sulfate of barium may be employed for painting colors, whereas aluminum-hydroxid may be employed for printing inks.

The following table gives some of the properties of the pigment colors obtained according to this invention:

| Colors prepared by the combination of diazotized— | | Gives pigment colors— |
|---|---|---|
| p-chloranilin-m-carboxylic acid | | Pure blue red (Ca-salt.) |
| Anilinmetacarboxylic acid | | Pure blue red (Ca-salt.) |
| Anilinparacarboxylic acid | with 2.3-oxynaphthoic acid | Pure blue red (Ca-salt.) |
| Amino aniseed acid | | Dark blue red (Pb-salt.) |
| Amino alkoxy salicylic acid | | Dark blue red (Pb-salt.) |
| Anthranilic acid | | Red (Ba-salt.) |
| p-chloranilin-o-carboxylic acid | | Blue red (Ca-salt.) |
| p-nitranilin-o-carboxylic acid | | Blue red (Ca-salt.) |

All these pigment colors are of an excellent fastness to light and quite insoluble in water, oil and alcohol.

Having thus described my invention, what I claim and desire to secure by Letters Patent, is—

1. The herein described process of manufacturing monoazo dyestuffs especially adapted for preparing red pigment colors insoluble in oil, consisting in causing 2.3-oxynaphthoic acid (having a melting point of 216° C.) to react with diazotized anilin carboxylic acids of the general formula $C_6X_4.NH_2.COOH$, wherein X means hydrogen atoms or Cl, Br, I, alkyl groups, oxalkyl groups, $NO_2$ and other indifferent substitutes.

2. As a new product the dyestuffs obtained by combining the diazotized anilin carboxylic acids of the general formula $C_6X_4.NH_2.COOH$, wherein X means hydrogen atoms or Cl, Br, I, alkyl groups, alkoxy groups, $NO_2$ and other indifferent substitutes with 2.3-oxynaphthoic acid having a melting point of 216° C. forming red pastes or red powders soluble in water to a red solution and soluble in concentrated sulfuric acid to a blue red solution from which the red brown free acids of the dyestuffs may be precipitated.

3. As a new product of manufacture, the pigment colors prepared by mixing the paste or the solution of dyestuffs of the general formula $C_6X_4.COOH.N_2.C_{10}H_5.OH.COOH$;

wherein X means hydrogen atoms or Cl, Br, I, alkyl groups, alkoxy groups, $NO_2$ and other different substitutes, with solutions of metal salts, the pigment colors so obtained being completely insoluble in water, oil and alcohol and of an excellent resistance to light.

In testimony whereof, I have signed my name to this specification, in the presence of two subscribing witnesses.

WILHELM KÖNIG.

Witnesses:
W. FOX BRUCE,
FR. STENGEL.